(12) United States Patent
Muthuramalingam et al.

(10) Patent No.: US 8,641,812 B2
(45) Date of Patent: Feb. 4, 2014

(54) GAS TREATMENT AND SOLAR THERMAL COLLECTION SYSTEM

(75) Inventors: Mahendhra Muthuramalingam, Virugambakkam (IN); Veerappan Muthaiah, Bangalore (IN)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 12/781,770

(22) Filed: May 17, 2010

(65) Prior Publication Data

US 2011/0277981 A1 Nov. 17, 2011

(51) Int. Cl.
*B01D 53/14* (2006.01)

(52) U.S. Cl.
USPC .............................................. 96/244; 96/242

(58) Field of Classification Search
None
See application file for complete search history.

(56) References Cited

U.S. PATENT DOCUMENTS

| | | | |
|---|---|---|---|
| 4,278,072 A | 7/1981 | Ryan et al. | |
| 4,478,210 A | 10/1984 | Sieradski | |
| 5,014,770 A | 5/1991 | Palmer | |
| 6,174,348 B1 * | 1/2001 | Ahmed et al. | 95/160 |
| 6,588,212 B1 * | 7/2003 | Wallace et al. | 60/772 |
| 7,294,327 B2 * | 11/2007 | McClanahan et al. | 423/578.1 |
| 2010/0005966 A1 * | 1/2010 | Wibberley | 95/179 |
| 2011/0000371 A1 * | 1/2011 | Eisenberger et al. | 95/227 |
| 2011/0041688 A1 * | 2/2011 | Eisenberger | 95/107 |

FOREIGN PATENT DOCUMENTS

| | | | |
|---|---|---|---|
| EP | 0133208 A2 * | 2/1985 | |
| WO | WO 9609501 A1 * | 3/1996 | |
| WO | WO 2010019990 A1 * | 2/2010 | |

OTHER PUBLICATIONS

EP 0133208A2.*
WO 2010019990A1.*

* cited by examiner

*Primary Examiner* — Duane Smith
*Assistant Examiner* — Phillip Shao
(74) *Attorney, Agent, or Firm* — Fletcher Yoder, P.C.

(57) ABSTRACT

According to various embodiments, a system includes a gas treatment system configured to treat a gas and a controller configured to control flow of a heat transfer fluid between a solar thermal collector and the gas treatment system. Conduits may interconnect the gas treatment system and the solar thermal collector.

20 Claims, 5 Drawing Sheets

GAS TREATMENT AND SOLAR THERMAL COLLECTION SYSTEM

BACKGROUND OF THE INVENTION

The subject matter disclosed herein relates to gas treatment systems, and, more particularly, to solar thermal collectors.

Gas treatment may be used in refineries, petrochemical plants, natural gas processing plants, or other industries. For example, gas treatment may be used in integrated gasification combined cycle (IGCC) power plants to treat synthesis gas, i.e., syngas. Specifically, solvents may be used to absorb gases, such as hydrogen sulfide ($H_2S$) or carbon dioxide ($CO_2$), from the syngas in a gas treatment unit. The gas treatment unit typically may include one or more distillation columns. One or more of these columns may include a heat exchanger to transfer heat from a fluid to the solvent. The fluid may be heated by a heat source, such as an electrical heater or a combustion system. Unfortunately, the heat source may be limited or unavailable, while also decreasing efficiency of the power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas treatment system configured to treat a gas and a controller configured to control flow of a heat transfer fluid between a thermal collector and the gas treatment system.

In a second embodiment, a system includes a solar thermal collector configured to heat a fluid and a controller configured to control flow of the fluid between the solar thermal collector and a gas treatment system.

In a third embodiment, a system includes a controller configured to control heat transfer between a solar thermal collector and a gas treatment system. The gas treatment system includes an acid gas removal system, a carbon capture system, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas treatment is conducted in petrochemical plants, refineries, natural gas processing plants, and other industries. Although discussed in terms of an IGCC power plant below, the disclosed embodiments may be used in any of the plants listed above or wherever gas treatment is performed. In particular, an IGCC power plant may include a gas treatment unit to treat syngas produced by a gasifier. The gas treatment unit may include, but is not limited to, one or more of the following units: a water gas shift reactor, an acid gas removal system, or a carbon capture system. Each of these units may remove a gas and/or other components from the untreated syngas from the gasifier. For example, the acid gas removal system may remove $H_2S$, $CO_2$, and/or other acidic gases from the untreated syngas.

One or more of the units included in the gas treatment unit may use a source of heat to remove the components from the untreated syngas. For example, the acid gas removal system may include a stripper column that uses heat to regenerate the solvent used to absorb the removed components. Steam is a common source of heat in IGCC power plants and may be used in the gas treatment unit. However, steam may be costly and/or unavailable in suitable quantities during certain periods, such as very hot days, during boiler outages, or when unavailable from elsewhere in the IGCC power plant. In the embodiments disclosed below, a renewable energy source, such as solar thermal energy, may be used to provide heat to the gas treatment unit. The solar thermal energy may be used to directly or indirectly heat the solvent (or other fluids) in the gas treatment unit. For example, the solar thermal energy may heat a heat transfer fluid, such as water, which then flows through a heat exchanger to transfer heat to the solvent. The renewable energy source (e.g. solar thermal heat) also improves the efficiency of the plant. For example, by using solar thermal energy, the net IGCC power plant efficiency may increase by approximately 0.1%, 0.2%, or 0.36% and the net IGCC power plant output may increase by approximately 2 megawatt, 4 megawatt, or 6 megawatt. Although solar energy is not available at night and may be affected by weather conditions, the combination of a solar thermal collector and a solar thermal storage system may enable solar thermal energy to be available 24 hours a day. Furthermore, a controller may be used to control the flow rate of the heat transfer fluid between the gas treatment unit and the solar thermal collector to account for daily and weather related variables. In addition, the controller may use steam to provide heat to the gas treatment unit when solar thermal energy is unavailable from either the solar thermal collector or the solar thermal storage system.

Figure 1:
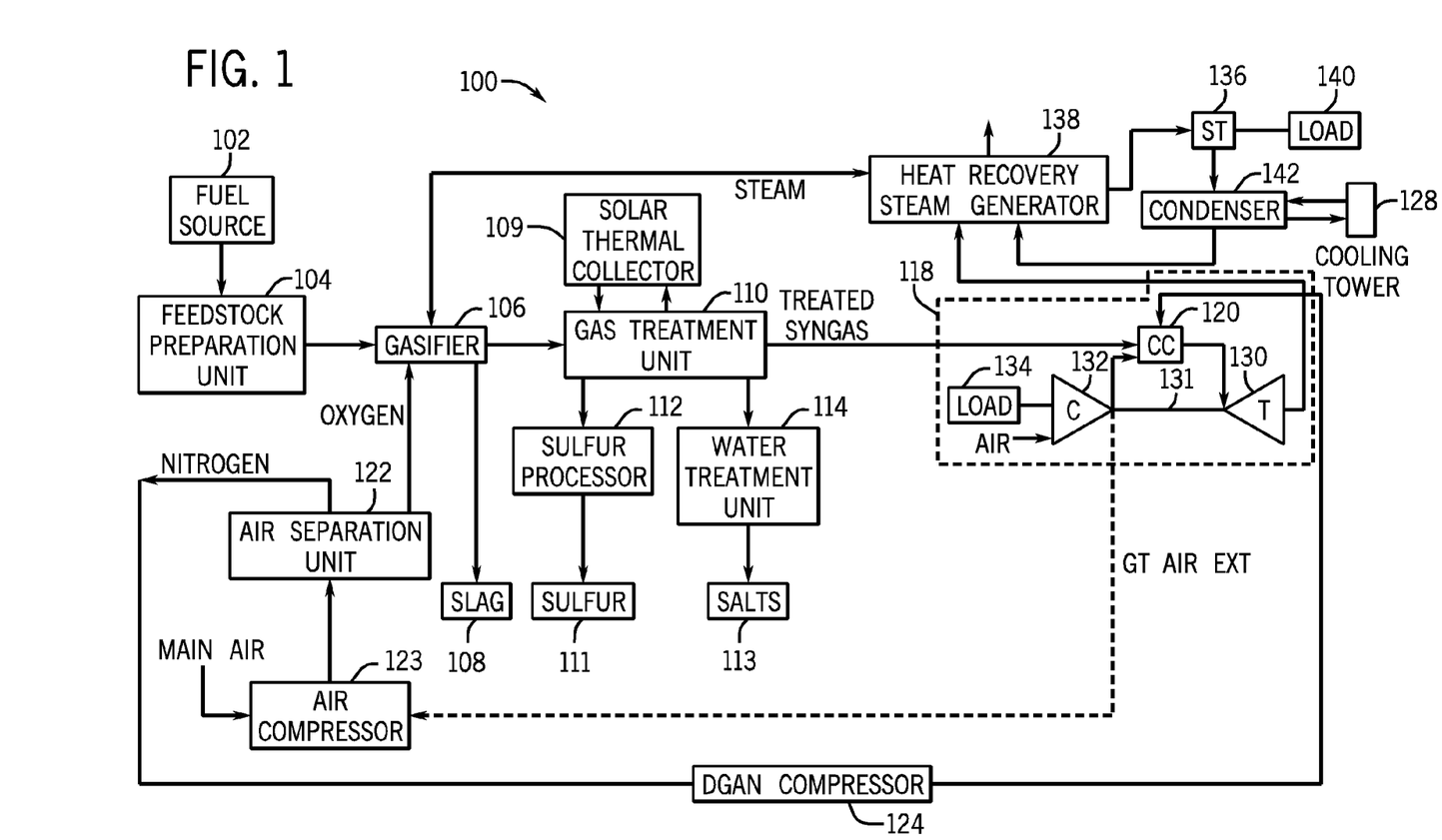
FIG. 1 is a block diagram of an IGCC power plant incorporating a solar thermal collector according to an embodiment.

Turning now to the drawings, FIG. 1 is a diagram of an embodiment of an IGCC system 100 that may produce and burn syngas. As discussed in detail below, the IGCC system 100 may include an embodiment of the controller that controls the flow of heat transfer fluid between the solar thermal collector and the gas treatment unit. Other elements of the IGCC system 100 may include a fuel source 102, which may be a solid or a liquid, that may be utilized as a source of energy for the IGCC system. The fuel source 102 may include coal, petroleum coke, oil, biomass, wood-based materials, agricultural wastes, tars, coke oven gas and asphalt, or other carbon containing items.

The fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock. In further embodiments, the feedstock preparation unit 104 may be omitted if the fuel source 102 is a liquid.

The feedstock may be passed to a gasifier 106 from the feedstock preparation unit 104. The gasifier 106 may convert the feedstock into a syngas, e.g., a combination of carbon monoxide (CO) and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius (C) to 1600 degrees C., depending on the type of gasifier 106 utilized. The gasification process may include the feedstock undergoing a pyrolysis process, whereby the feedstock is heated. Temperatures inside the gasifier 106 may range from approximately 150 degrees C. to 700 degrees C. during the pyrolysis process, depending on the fuel source 102 utilized to generate the feedstock. The heating of the feedstock during the pyrolysis process may generate a solid (e.g., char) and residue gases (e.g., CO, hydrogen, and nitrogen). The char remaining from the feedstock from the pyrolysis process may only weigh up to approximately 30% of the weight of the original feedstock.

The volatiles generated during pyrolysis, also known as devolatilization, may be partially combusted by introducing oxygen to the gasifier 106. The volatiles may react with the oxygen to form $CO_2$ and CO in combustion reactions, which provide heat for the subsequent gasification reactions. The temperatures generated by the combustion reactions may range from approximately 700 degrees C. to 1600 degrees C. Next, steam may be introduced into the gasifier 106 during a gasification step. The char may react with the $CO_2$ and steam to produce CO and hydrogen at temperatures ranging from approximately 800 degrees C. to 1100 degrees C. In essence, the gasifier utilizes steam and oxygen to allow some of the feedstock to be "burned" to produce CO and release energy, which drives a second reaction that converts further feedstock to hydrogen and additional $CO_2$.

In this way, the gasifier 106 manufactures a resultant gas. This resultant gas may include approximately 85% of CO and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 106 may also generate waste, such as slag 108, which may be a wet ash material. This slag 108 may be removed from the gasifier 106 and disposed of, for example, as road base or as another building material. To clean the untreated syngas, a gas treatment unit 110 may be utilized. In one embodiment, the gas treatment unit 110 may include a water gas shift reactor, an acid gas removal system, a carbon capture system, or any combination thereof. These systems are discussed in more detail below. In addition, a heat transfer fluid may be circulated between the gas treatment unit 110 and a solar thermal collector 109 to provide heat to the components of the gas treatment unit 110 as listed above. Further details regarding the relationship between the gas treatment unit 110 and the solar thermal collector 109 are discussed below. The gas treatment unit 110 may scrub the untreated syngas to remove the HCl, HF, COS, HCN, and $H_2S$ from the untreated syngas, which may include separation of sulfur 111 in a sulfur processor 112. Furthermore, the gas treatment unit 110 may separate salts 113 from the untreated syngas via a water treatment unit 114 that may utilize water purification techniques to generate usable salts 113 from the untreated syngas. Subsequently, the gas from the gas treatment unit 110 may include treated syngas (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas may include approximately 3% CO, approximately 55% $H_2$, and approximately 40% $CO_2$ and is substantially stripped of $H_2S$.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally, the ASU 122 may transmit separated nitrogen to a diluent nitrogen (DGAN) compressor 124.

The DGAN compressor 124 may compress the nitrogen received from the ASU 122 at least to pressure levels equal to those in a combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of a gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Water from the cooling tower 128 may also be used as a coolant for the fuel injector 104. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
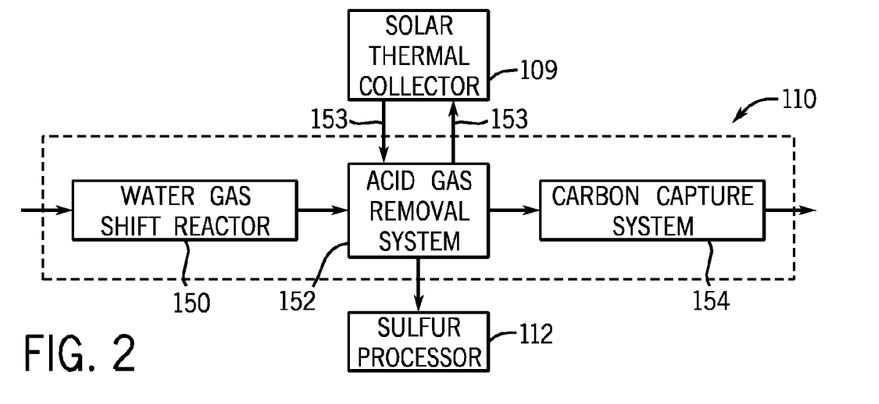
FIG. 2 is a block diagram of a gas treatment unit and the solar thermal collector of FIG. 1 according to an embodiment.

To provide more detail regarding the gas treatment unit 110, FIG. 2 shows one embodiment that includes different unit operations that may be performed in the gas treatment unit 110 and how those unit operations may interact with the solar thermal collector 109. Other embodiments are possible in which the gas treatment unit 110 includes additional unit operations, omits unit operations, and/or has unit operations arranged in a different order. In the illustrated embodiment, the gas treatment unit 110 includes a water gas shift reactor 150. The water gas shift reactor 150 may be configured to perform a water gas shift reaction, wherein CO reacts with water (e.g., steam), to form $CO_2$ and hydrogen. The water gas shift reaction may be performed to adjust the ratio of hydrogen to $CO_2$ in the untreated syngas from approximately 1 to 1 to approximately 3 to 1.

Next, in the illustrated embodiment shown in FIG. 2, the treated gas from the water gas shift reactor 150 may pass to an acid gas removal system 152. The acid gas removal system 152 may remove $CO_2$ and/or other acid gases from the syngas. Specific details regarding the operation of the acid gas removal system 152 will be described below. Hydrogen sulfide removed by the acid gas removal system 152 may pass to a sulfur processor 112, which produces elemental sulfur 111 from the $H_2S$. In the illustrated embodiment, the treated syngas from the acid gas removal system 152 may pass to a carbon capture system 154.

The carbon capture system 154 of the gas treatment unit 110 shown in FIG. 2 may remove and process the carbonaceous gas (e.g., $CO_2$ that may be approximately 80-100 or 90-100 percent pure by volume) included in the syngas. The carbon capture system 154 also may include a compressor, a purifier, a pipeline that supplies $CO_2$ for sequestration or enhanced oil recovery, a $CO_2$ storage tank, or any combination thereof. The treated syngas, which has undergone the removal of its sulfur containing components and a large fraction of its $CO_2$, may be then transmitted to a combustor 120, e.g., a combustion chamber, of a gas turbine engine 118 as combustible fuel.

The acid gas removal system 152 of the gas treatment unit 110 shown in FIG. 2 may require a source of heat. The source of heat may be steam and/or the solar thermal collector 109. A heat transfer fluid 153 may circulate between the solar thermal collector 109 and the acid gas removal system 152. Hot heat transfer fluid 153 from the solar thermal collector 109 may pass to the acid gas removal system 152 and cool heat transfer fluid 153 from the acid gas removal system 152 may pass back to the solar thermal collector 109 to be reheated. Examples of heat transfer fluids include, but are not limited to, eutectic mixtures of biphenyl and diphenyl ether, water, steam, oil, synthetic liquids, molten salts, other suitable liquids or gases, or any combination thereof. In addition, other unit operations that may be included in the gas treatment unit 110 or in other unit operations within the IGCC system 100 that require heat may also be connected to the solar thermal collector 109.

Figure 3:
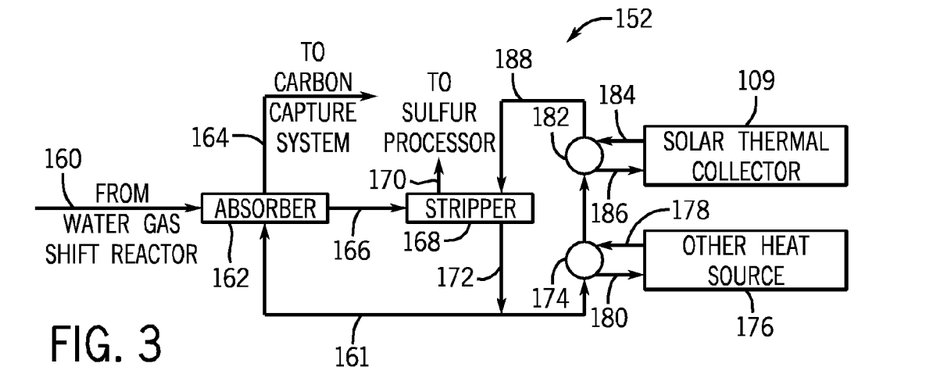
FIG. 3 is a block diagram of an acid gas removal system and the solar thermal collector according to an embodiment.

Turning to the acid gas removal system 152 in more detail, FIG. 3 shows one embodiment for removing $H_2S$ from untreated syngas utilizing the solar thermal collector 109.

Other embodiments using other solvents, other configurations, or other technologies may also be used to remove $H_2S$ from untreated syngas. In the illustrated embodiment, untreated syngas 160 from the water gas shift reactor 150, or the gasifier 106 if the water gas shift reactor is not used, may be directed to an absorber 162. The absorber 162 may be a packed or trayed distillation column, or any other device capable of separating mixtures of liquids and/or gases. The absorber 162 is configured to provide a counterflow of the untreated syngas 160 and a solvent 161, e.g., the solvent 161 flows down the column contacting the untreated syngas 160 flowing up and exiting the top of the column. As a result, $H_2S$-lean gas 164 exits the top of the absorber 162 and $H_2S$-rich solvent 166 exits the bottom of the absorber 162. The $H_2S$-lean gas 164 may be $CO_2$ lean and further directed to the carbon capture system 154.

The $H_2S$-rich solvent stream 166 from the absorber 162 may directed to a stripper 168. The stripper 168 may be a packed or trayed distillation column, or any other device capable of separating mixtures of liquids and/or gases, that regenerates the solvent by removing the $H_2S$ from the solvent. An $H_2S$-rich stream 170 exiting the top of the stripper 168 may be directed to the sulfur processor 112. A first portion of an $H_2S$-lean solvent 172 exiting the bottom of the stripper 168 may be recycled back to the absorber 162. Thus, the solvent cycle between the absorber 162 and the stripper 168 may be referred to as a solvent path. A second portion of the $H_2S$-lean solvent 172 may be recycled back to the stripper 168 after being vaporized in a heat exchanger, such as a reboiler.

For example, the $H_2S$-lean solvent 172 may be directed to a first reboiler 174 and vaporized by a heat source 176. Examples of the heat source 176 include, but are not limited to, a boiler, combustor, gas turbine, HRSG, solar thermal collector, or other heat-generating unit. A hot stream 178 from the heat source 176 flows through one path in the first reboiler 174 to transfer heat to the $H_2S$-lean solvent 172 flowing through another path in the first reboiler 174. A cool stream 180 passes from the first reboiler 174 back to the heat source 176 to be reheated and reused. The streams 178 and 180 may include water, steam, oil, or any other suitable heat transfer fluid. Alternatively, if the heat source 176 is not a closed loop system, the cool stream 180 may not be recirculated to be reheated.

The first reboiler 174 and a second reboiler 182 may be used alone or in combination with one another. As discussed below, the system 152 may selectively engage or disengage the reboilers 174 and 182 depending on available heat from the heat source 176 and solar thermal collector 109, among other considerations. The first reboiler 174 may be used while the second reboiler 182 is unable to provide sufficient heat, or vice versa. Alternatively, the first reboiler 174 and second reboiler 182 may be arranged in parallel or in series to provide greater heat transfer to the $H_2S$-lean solvent 172. During operation of the second reboiler 182, a hot heat transfer fluid 184 flows from the solar thermal collector 109 through a path in the second reboiler 182 to transfer heat to the $H_2S$-lean solvent 172 flowing through another path in the second reboiler 182. A cool heat transfer fluid 186 passes from the second reboiler 182 back to the solar thermal collector 109 to be reheated and reused. The fluids 184 and 186 may include water, steam, oil, or any other suitable heat transfer fluid. A vaporized $H_2S$-lean solvent 188 is directed back to the stripper 168 to drive the distillation process in the column. Examples of solvents that may be used in the acid gas removal system 152 include, but are not limited to, alkanolamines, such as monoethanolamine (MEA), diethanolamine (DEA), and/or methyldiethanolamine (MDEA), dimethyl ethers of polyethylene glycol, methanol, n-methyl-2-pyrrolidone, propylene carbonate, or any combination thereof. As mentioned above, additional distillation columns and/or differently arranged columns may be used in other embodiments of the acid gas removal system 152.

Figure 4:
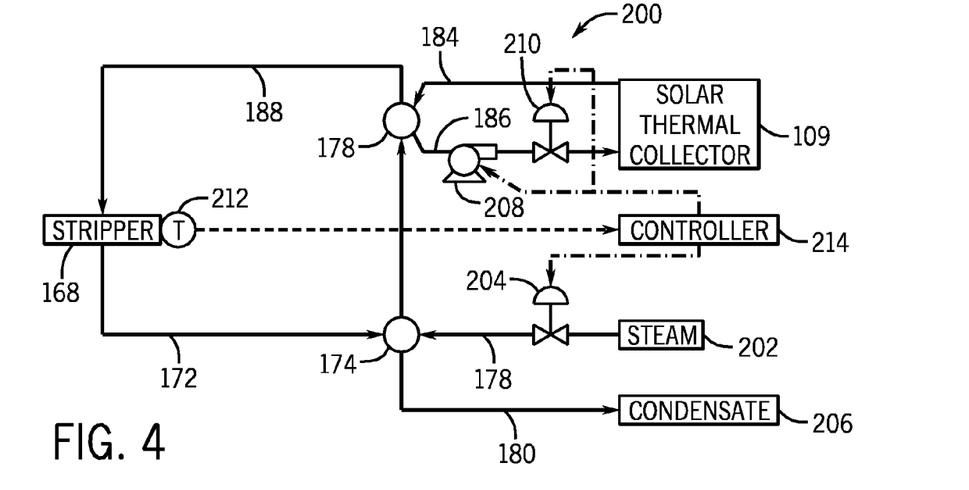
FIG. 4 is a block diagram showing a portion of the control scheme of the acid gas removal system of FIG. 3 according to an embodiment.

FIG. 4 shows an embodiment of a control scheme 200 utilizing the solar thermal collector 109 with the stripper 168. Other embodiments of control schemes using different instrumentation and/or different configurations also may be used to control the heat transfer for the stripper 168. In the illustrated embodiment, the heat source 176 includes steam 202. The flow rate of steam to the first reboiler 174 may be adjusted by steam control valve 204. After the steam 202 passes through the reboiler 174 and transfers heat to the $H_2S$-lean solvent 172, it may condense to form condensate 206. The condensate 206 may be directed to a steam plant or other source of energy to be vaporized into steam 202 and recycled back to the first reboiler 174. Turning to the second reboiler 178, the cool heat transfer fluid 186 may be transferred from the second reboiler 178 back to the solar thermal collector 109 by a heat transfer fluid pump 208. A heat transfer fluid control valve 210 may be used to adjust the flow rate of the cool heat transfer fluid 186. In addition, the stripper 168 may include a temperature indicator 212, which may be used to indicate a temperature of the stripper 168.

In the illustrated embodiment, a controller 214 may receive input from various sensors, such as the temperature indicator 212, and provide output to various control devices, such as steam control valve 204, heat transfer fluid control valve 210, and/or heat transfer fluid pump 208. Examples of technologies that may be used for the controller 214 include, but are not limited to, open or closed loop control, linear or non-linear control, programmable logic controllers (PLC), distributed control systems (DCS), model predictive control, statistical process control, or other methods of advanced process control. For example, the controller 214 may adjust steam control valve 204 and/or heat transfer fluid control valve 210 to maintain a stripper temperature measured by temperature indicator 212 at or near a set point. Alternatively, the controller 214 may adjust steam control valve 204 and/or heat transfer fluid control valve 210 to maintain another stripper variable, such as pressure, level, or flow rate, at or near a set point. In addition, the controller 214 may optimize the relative flow rates of steam 202 and/or heat transfer fluid 184 depending on process and economic constraints. For example, if steam 202 is unavailable or more expensive than solar thermal energy, the controller 214 may throttle or close steam control valve 204 and may open heat transfer fluid control valve 210 to control the stripper temperature. Conversely, if solar thermal energy is unavailable or more expensive than steam 202, the controller 214 may throttle or close heat transfer fluid control valve 210 and may open steam control valve 204 to control the stripper temperature. In addition, if the steam 202 and heat transfer fluid 184 are at different temperatures, the controller 214 may adjust the flow rates of both to achieve a blend of the $H_2S$-lean solvent 172 at a desired temperature.

Figure 5:
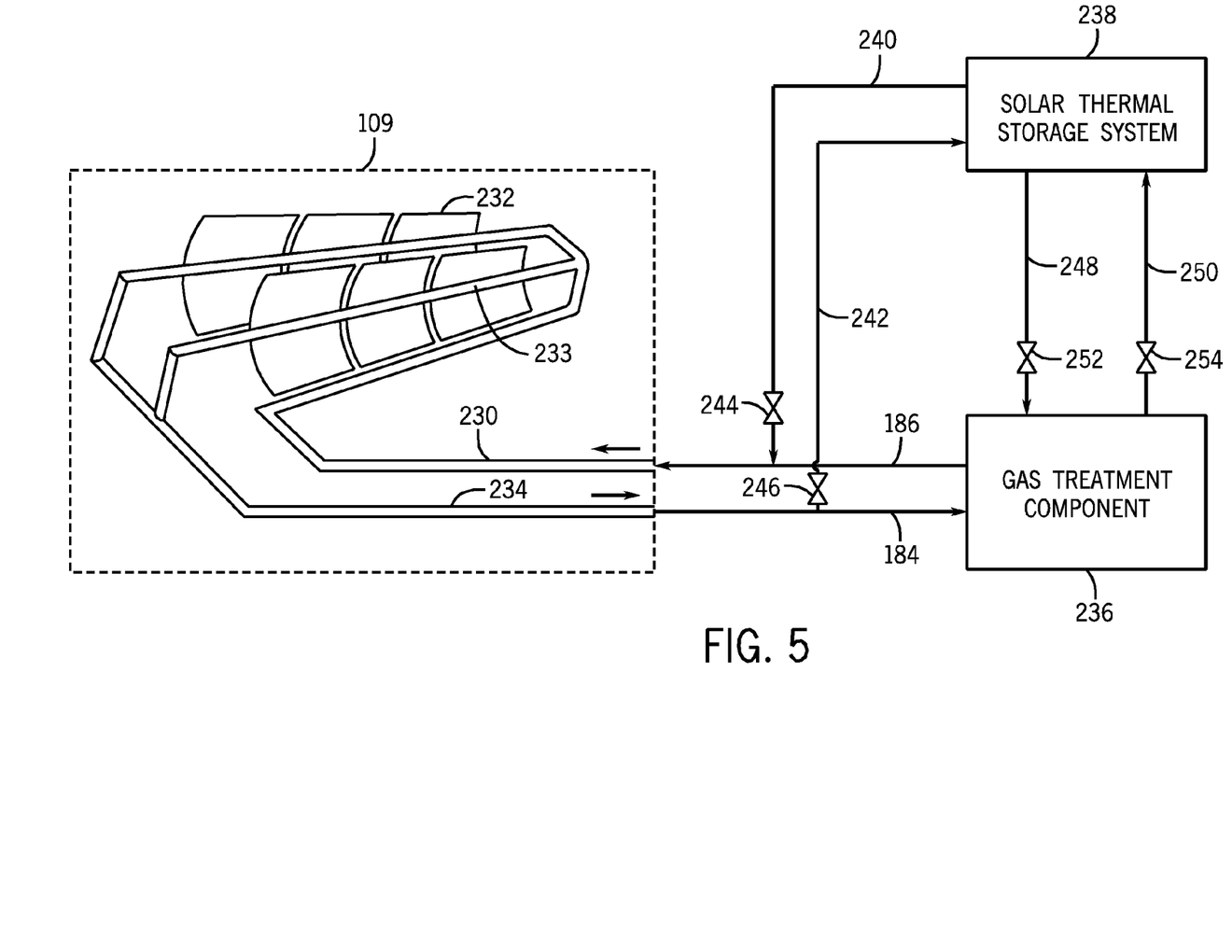
FIG. 5 is a schematic of a solar thermal collector, solar thermal storage system, and gas treatment component according to an embodiment.

FIG. 5 shows a schematic of an embodiment of the solar thermal collector 109 and interconnections with other equipment. Specifically, inlet piping 230 may be used to carry cool heat transfer fluid to the solar thermal collector 109. The solar thermal collector 109 is configured to collect solar thermal energy to heat the fluid received by the inlet piping 230. In certain embodiments, the solar thermal collector 109 may include one or more solar thermal collection devices 232 coupled together in a solar field or solar farm, which may include greater than approximately 10 devices, 50 devices, 100 devices, 500 devices, or 1000 devices. Examples of solar thermal collection devices 232 may include, but are not limited to, parabolic troughs, Fresnel reflectors, heliostats, or any combination thereof. For example, a solar field of approximately 56 parabolic trough reflectors with a total reflective area of approximately 90,000 m$^2$ may be able to absorb approximately 12,000 kW (net). The solar thermal collection devices 232 may be configured to point generally in the direction of maximum sunlight, or may be configured to track the movement of the sun throughout the day. Solar energy reflected and concentrated by the solar thermal collection devices 232 is directed toward an absorber 233. The absorber 233 may be a continuation of the inlet piping 230 and configured to maximize absorbed solar energy and minimize reflected solar energy to increase efficiency of the solar thermal collector 109. Heat transfer fluid flowing through the absorber 233 absorbs heat from the solar energy and increases in temperature as it passes through the solar thermal collection devices 232. For example, the heat transfer fluid in the absorber 233 may increase in temperature by approximately 100 degrees C., 200 degrees C., or even 350 degrees C. The hot heat transfer fluid 184 is directed away from the solar thermal collector 109 through outlet piping 234 and may be directed to a gas treatment component 236. The gas treatment component 236 may include, but is not limited to, the acid gas removal system 152, or any other component that may require heat. After transferring heat to the gas treatment component 236, the cool heat transfer fluid 186 is directed back to the solar thermal collector 109 to be reheated.

When sunlight is unavailable and/or when the solar thermal collector 109 is not in use, a solar thermal storage system 238 may be used to store the solar thermal energy for later use. A variety of technologies may be used to store the solar thermal energy. Examples include, but are not limited to, steam accumulators and molten salt storage. In the illustrated embodiment, when sunlight is available, cool circulating fluid 240 from the solar thermal storage system 238 may be directed to the solar thermal collector 109. After the cool circulating fluid 240 is heated by the solar thermal collector 109, hot circulating fluid 242 may pass from the solar thermal collector 109 back to the solar thermal storage system 238 to be stored. The cool circulating fluid 240 and the hot circulating fluid 242 may include gases or liquids, such as steam or molten salt, suitable for efficient storage of heat energy. Alternatively, a heat transfer fluid other than steam or molten salt may be used for the cool circulating fluid 240 and the hot circulating fluid 242 and the solar thermal storage system 238 may include a heat exchanger that enables heat to be transferred from the hot circulating fluid 242 to a cool storage fluid 250, such as steam or molten salt, used to store solar thermal energy in the solar thermal storage system 238. Cool circulating fluid valve 244 and hot circulating fluid valve 246 may both be closed when the solar thermal storage system 238 is not being heated by the solar thermal collector 109.

Once solar thermal energy is stored in the solar thermal storage system 238, the system may selectively transfer a hot storage fluid 248, such as steam or molten salt, from the solar thermal storage system 238 to the gas treatment component 236. Alternatively, a heat exchanger similar to that described above may be used to circulate a heat transfer fluid other than steam or molten salt between the solar thermal storage system 238 and the gas treatment component 236. After transferring heat to the gas treatment component 236, the cool storage fluid 250 may pass back to the solar thermal storage system 238. Hot storage fluid valve 252 and cool storage fluid valve 254 may be used to isolate the solar thermal storage system 238 from the gas treatment component 236 while the solar thermal storage system 238 is not used to supply heat to the gas treatment component 236. An advantage of using the solar thermal storage system 238 is that solar thermal energy may be used to provide heat to the gas treatment component 236 even at night or when sunlight is unavailable. Examples of circulating fluids 240 and 242 and storage fluids 248 and 250 include, but are not limited to, eutectic mixtures of biphenyl and diphenyl ether, water, steam, oil, synthetic liquids, molten salts, such as combinations of sodium nitrate and potassium nitrate, other suitable liquids or gases, or any combination thereof.

Figure 6:
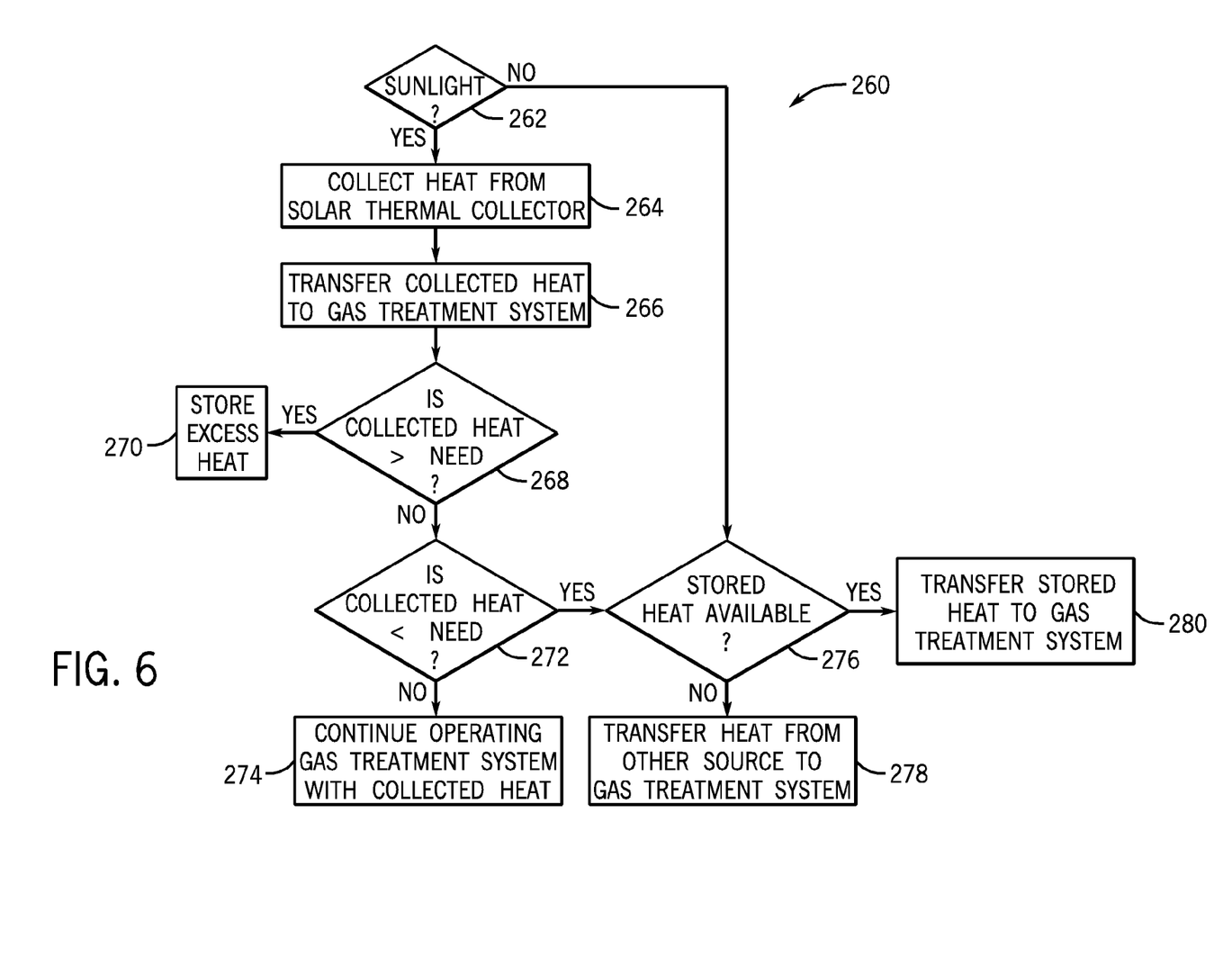
FIG. 6 is a flow chart of a process for controlling a gas treatment unit and solar thermal collector according to an embodiment.

FIG. 6 shows an exemplary method 260 that may be used by the controller 214 to control the flow of heat transfer fluid between the solar thermal collector 109 and the gas treatment unit 110. The method 260 may be used whether sunlight is available or not and during any time of day. First, the controller 214 determines availability of sunlight in step 262. This may be accomplished using the time of day and times for sunrise and sunset or using a sensor, such as a photovoltaic cell. If sunlight is available, heat from the solar thermal collector 109 is collected in step 264. Because solar thermal energy may be less expensive than other sources of heat, method 260 may be configured to use solar thermal energy whenever possible. Thus, in the next step 266, heat collected from the solar thermal collector 109 is transferred to the gas treatment system 110.

In the next step 268 of FIG. 6, if the amount of heat collected is greater than the amount of heat needed by the gas treatment system 110, then excess heat is stored in step 270. Any of the solar thermal storage systems 238 described above may be used to store excess heat. On the other hand, if the amount of collected heat is not greater than the amount needed, then the method 260 proceeds to the next step 272. If the amount of collected heat is not less than the amount needed, then in step 274, operation of the gas treatment system 110 continues with the heat collected from the solar thermal collector 109. On the other hand, if the amount of collected heat is less than the amount needed, then in step 276, the controller 214 determines whether stored heat is available. If stored heat is not available, then in step 278, heat from another source, such as steam, is transferred to the gas treatment system 110. On the other hand, if stored heat is available, then in step 280, heat from the solar thermal storage system 238 is transferred to the gas treatment system 110. Returning to step 262, if sunlight is not available, then the controller 214 proceeds to step 276 to determine if stored heat is available or not. Thus, the controller 214 uses a priority system in which solar thermal energy is used as a first priority, stored solar thermal energy is used as a second priority, and heat from another source is used as a third priority. This priority system is used because both solar thermal energy and stored solar thermal energy may be less expensive than another heat source, such as steam.

Figure 7:
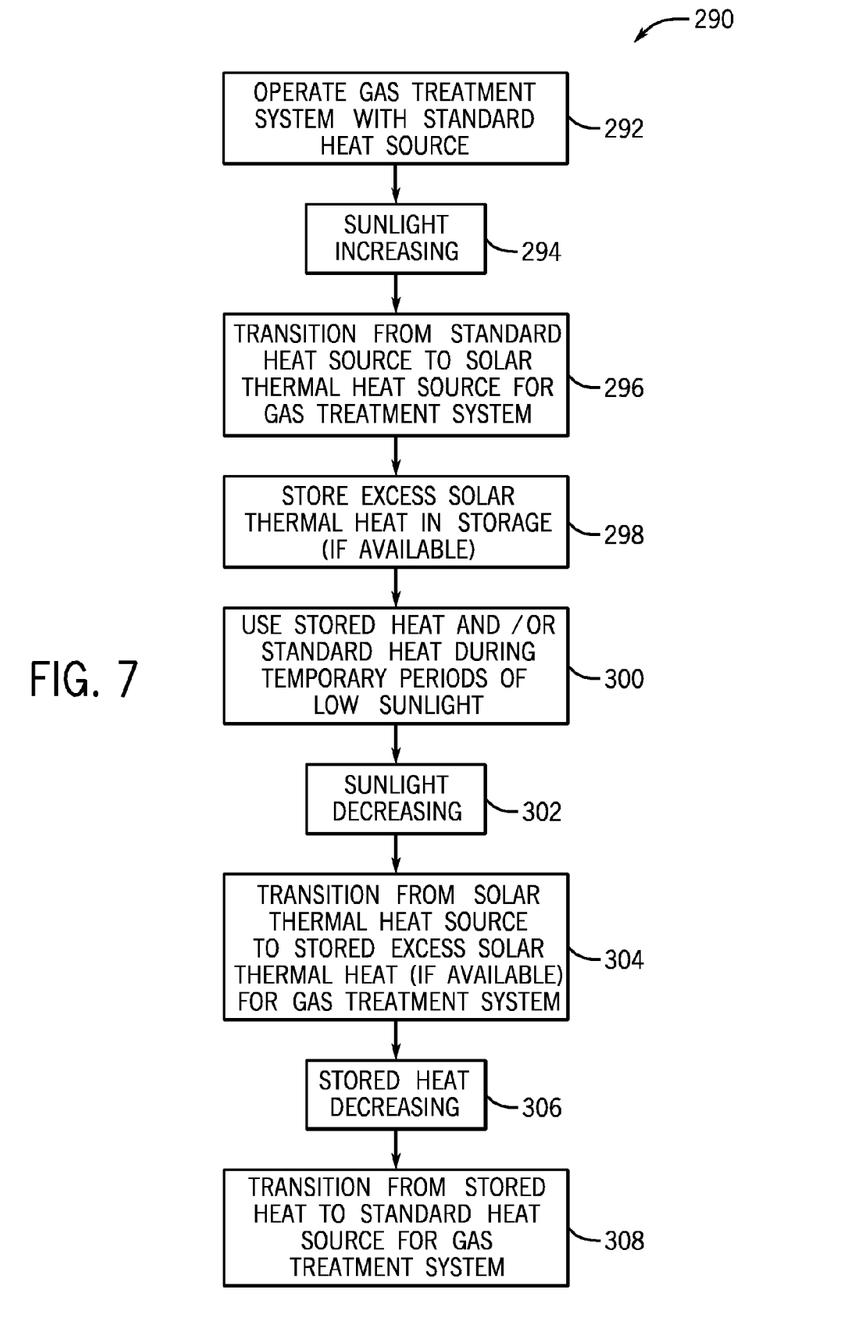
FIG. 7 is a flow chart of a process for controlling a gas treatment system and solar thermal collector during a 24 hour cycle according to an embodiment.

Another exemplary method 290 of controlling the flow of heat transfer fluid between the solar thermal collector 109 and the gas treatment unit 110 over the course of an entire day is shown in FIG. 7. In the first step 292, the controller 214 operates the gas treatment system using a standard heat source, such as steam. The controller 214 may remain in step 292 between sunset and sunrise when sunlight is unavailable or insufficient. Next, in step 294, the amount of sunlight begins to increase as the sun rises. In step 296, the controller 214 transitions from the standard heat source to solar thermal energy from the solar thermal collector 109 to be used for the gas treatment system 110. As described previously, the controller 214 uses solar thermal energy whenever sunlight is available, as it may be less expensive than the standard heat source. In step 298, the controller 214 stores excess solar thermal heat in storage, if a storage system is available. Step 298 assumes that more solar energy is collected than is required by the gas treatment system 110 during some parts of the day. Thus, this excess solar thermal heat may be used at a later time when sunlight is unavailable.

In step 300 of FIG. 7, the controller 214 uses stored heat and/or heat from the standard heat source during temporary periods of low sunlight. For example, during periods of cloudiness, the controller 214 may be able to provide the heat needed for the gas treatment unit 110 by using other sources, such as stored solar thermal energy or the standard heat source. When sunlight becomes available again, the controller 214 will return to using solar thermal energy from the solar thermal collector 109. In step 302, the amount of sunlight begins to decrease as the sun sets. Thus, in step 304, the controller 214 transitions from solar thermal heat to stored excess solar thermal heat, if available, for the gas treatment system 110. Next, in step 306, the amount of heat available in the solar thermal storage system 238 decreases as it becomes exhausted. Therefore, the controller 214 transitions from stored thermal heat to the standard heat source in step 308. If the solar thermal storage system 238 is not available, then the controller 214 transitions to the standard heat source as soon as sunlight begins to decrease in step 302. The controller 214 continues to use the standard heat source until sunlight is available again when the sun rises. Thus, the cycle represented by method 290 may repeat on a daily basis.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gasification system configured to generate a combustible gas;
   a gas treatment system coupled to the gasification system and configured to treat the combustible gas to generate a treated combustible gas; and
   a controller configured to control flow of a heat transfer fluid between a solar thermal collector and the gas treatment system, and configured to use solar thermal energy from the solar thermal collector as a first priority.

2. The system of claim 1, wherein the gas treatment system comprises a solvent path and a heat exchanger, and the heat exchanger is configured to transfer heat from the heat transfer fluid to a solvent in the solvent path.

3. The system of claim 1, wherein the gas treatment system comprises an acid gas removal system.

4. The system of claim 1, wherein the gas treatment system comprises a carbon capture system.

5. The system of claim 1, comprising a gas turbine engine coupled to the gas treatment system and configured to combust the treated combustible gas from the gas treatment system.

6. The system of claim 1, comprising a solar field having a plurality of solar thermal collectors, wherein the controller controls flow of the heat transfer fluid between the solar field and the gas treatment system.

7. The system of claim 1, wherein the controller is configured to transition between the solar thermal collector and a second heat source based on availability of sunlight.

8. The system of claim 7, comprising the second heat source, wherein the second heat source comprises a steam source.

9. A system, comprising:
   a controller configured to control heat transfer between a solar thermal collector and a gas treatment system, wherein the controller is configured to control heat transfer between a second heat source and the gas treatment system, wherein the controller is configured to use solar thermal energy from the solar thermal collector as a first priority and second energy from the second heat source as a second priority, and wherein the gas treatment system comprises an acid gas removal system, a carbon capture system, or a combination thereof.

10. The system of claim 9, wherein the controller is configured to transition from the solar thermal collector to the second heat source when sunlight is insufficient or unavailable, and the controller is configured to transition from the second heat source to the solar thermal collector when sunlight is sufficient or available.

11. The system of claim 1, comprising:
    a sensor coupled to the controller and configured to provide an input of the gas treatment system to the controller; and
    a control device coupled to the controller and configured to receive an output from the controller to adjust the flow of the heat transfer fluid between the solar thermal collector and the gas treatment system.

12. The system of claim 1, comprising a solar thermal storage system coupled to both the gas treatment system and the solar thermal collector, wherein the solar thermal storage system is configured to store the heat transfer fluid or a second heat transfer fluid.

13. The system of claim 1, wherein the gas treatment system comprises:
    a water gas shift reactor configured to perform a water gas shift reaction of the combustible gas; and
    an acid gas removal system coupled to the water gas shift reactor and configured to remove an acid gas from the combustible gas from water gas shift reactor.

14. The system of claim 13, wherein the gas treatment system comprises a carbon capture system coupled to the acid gas removal system and configured to remove a carbonaceous gas from the combustible gas from the acid gas removal system.

15. The system of claim 9, comprising:
    a sensor coupled to the controller and configured to provide an input of the gas treatment system to the controller; and
    a control device coupled to the controller and configured to receive an output from the controller to adjust the heat transfer between the solar thermal collector and the gas treatment system.

16. A system, comprising:
    a gas treatment system configured to treat a combustible gas, wherein the gas treatment system comprises:
    a solvent path;
    a first heat exchanger disposed in the solvent path and configured to transfer heat from a first heat transfer fluid to a solvent in the solvent path; and
    a second heat exchanger disposed in the solvent path and configured to transfer heat from a second heat transfer fluid to the solvent in the solvent path; and a controller configured to control a first flow of the first heat transfer fluid between a solar thermal collector and the first heat exchanger, configured to control a second flow of the second heat transfer fluid between a second heat source and the second heat exchanger, and configured to use solar thermal energy from the solar thermal collector as a first priority and second energy from the second heat source as a second priority.

17. The system of claim 16, wherein the controller is configured to transition between operation of the solar thermal collector and the second heat source based on availability of sunlight.

18. The system of claim 16, comprising the second heat source, wherein the second heat source comprises a steam source configured to provide steam as the second heat transfer fluid.

19. The system of claim 9, wherein the controller is configured to control heat transfer between a third heat source and the gas treatment system, and is configured to use third energy from the third heat source as a third priority.

20. The system of claim 19, comprising:
the second heat source, wherein the second heat source comprises a solar thermal storage system coupled to both the gas treatment system and the solar thermal collector; and
the third heat source, wherein the third heat source comprises a steam source.

* * * * *